US008866341B2

(12) United States Patent
Riederer

(10) Patent No.: US 8,866,341 B2
(45) Date of Patent: Oct. 21, 2014

(54) VOLTAGE REGULATOR

(75) Inventor: Roman Riederer, Villach (AT)

(73) Assignee: Infineon Technologies AG, Neubiberg (DE)

( * ) Notice: Subject to any disclaimer, the term of this patent is extended or adjusted under 35 U.S.C. 154(b) by 880 days.

(21) Appl. No.: 12/987,274

(22) Filed: Jan. 10, 2011

(65) Prior Publication Data

US 2012/0176109 A1 Jul. 12, 2012

(51) Int. Cl.
*H02J 1/00* (2006.01)
*H02J 3/00* (2006.01)
*G05F 1/56* (2006.01)

(52) U.S. Cl.
CPC .......................................... *G05F 1/56* (2013.01)
USPC ................... 307/80; 307/81; 307/82; 307/84; 307/85; 307/86

(58) Field of Classification Search
CPC .................................... H02J 1/00; H02M 3/00
USPC ............................................................ 307/80
See application file for complete search history.

(56) References Cited

U.S. PATENT DOCUMENTS 7,148,587 B2 * 12/2006 Matsuda et al. ................ 307/80
7,498,694 B2 * 3/2009 Luo et al. ........................ 307/82
2006/0001321 A1 1/2006 Baglin et al.
2007/0285152 A1 12/2007 Fujita et al.
2009/0179890 A1 7/2009 Nishimura et al.
2009/0309562 A1 12/2009 Lipcsei et al.
2010/0327832 A1 * 12/2010 Nishida ......................... 323/282

FOREIGN PATENT DOCUMENTS

CN 101136591 A 3/2008
CN 101483412 A 7/2009
CN 201298178 Y 8/2009
CN 101609347 A 12/2009

* cited by examiner

*Primary Examiner* — Rexford Barnie
*Assistant Examiner* — Toan Vu
(74) *Attorney, Agent, or Firm* — Murphy, Bilak & Homiller, PLLC

(57) ABSTRACT

A voltage regulator circuit for providing a regulated output voltage is provided. The voltage regulator circuit includes an error amplifier configured to provide a control signal based on at least a portion of a fed-back output voltage and a reference voltage. A first output stage is configured to operate at a first supply voltage and provide the regulated output voltage based on the control signal. At least one second output stage configured to operate at a second supply voltage different from the first supply voltage and provide the regulated output voltage based on the control signal. A switch-over unit is configured to switch over the control signal between the first output stage and the second output stage.

18 Claims, 6 Drawing Sheets

VOLTAGE REGULATOR

TECHNICAL FIELD

Embodiments relate to an electronic circuit configured to provide an output voltage for operating a load connected to its output, and more particularly to a voltage regulator circuit configured to provide a regulated output voltage and a method for providing a regulated output voltage.

BACKGROUND

Voltage regulator circuits may provide a predetermined output voltage even if a load connected to an output terminal of the voltage regulator circuit consumes varying energy amount, i.e. energy deposited in the load varies. The voltage regulator circuit is operated at a supply voltage (VDD) which is determined by the operation environment of the voltage regulator circuit. The operation environment of the voltage regulator circuit may be a mobile phone, a notebook computer, a personal computer, etc.

In normal operation, the supply voltage (VDD) of the voltage regulator circuit exceeds the output voltage provided by the voltage regulator circuit. A large difference between the supply voltage and the output voltage of the voltage regulator circuit may result in increased power dissipation within the voltage regulator circuit, which in turn results in reduced battery-operating time, especially for mobile devices.

In order to adapt the supply voltage to a desired output voltage, i.e. in order to provide a predetermined voltage difference between the supply voltage and the output voltage, an operation of the voltage regulator circuit using different supply voltages may reduce overall power consumption of an electronic device which includes the voltage regulator circuit. Thus, switching over between different supply voltages in an efficient manner using an electronic circuit with low chip area consumption is an issue.

SUMMARY

Embodiments described herein refer inter alia to a voltage regulator circuit configured to provide a regulated output voltage. The voltage regulator circuit includes an error amplifier configured to provide a control signal on the basis of at least a portion of fed-back output voltage and a reference voltage. A first output stage can be operated at a first supply voltage and provide the regulated output voltage on the basis of the control signal. At least one second output stage can be operated at a second supply voltage which is different from the first supply voltage.

Furthermore, the second output stage provides the regulated output voltage on the basis of the control signal. A switch-over unit is configured to switch over the control signal between the first output stage, when the regulator circuit is operated at the first supply voltage, and the second output stage, when the voltage regulator circuit is operated at the second supply voltage.

In addition, embodiments described herein refer inter alia to an electronic circuit configured to provide an output voltage, wherein the electronic circuit includes an output circuit configured to be controlled by a control signal. The output circuit includes the first output stage which can be operated at a first supply voltage and provide the output voltage on the basis of the control signal, and at least one second output stage which can be operated at a second supply voltage different from the first supply voltage and provide the output voltage on the basis of the control signal. The electronic circuit may include a switch-over unit configured to switch over the control signal between the first output stage and the second output stage.

According to yet a further embodiment described herein, a method for providing a regulated output voltage includes providing a reference voltage, providing a first supply voltage, regulating the output voltage on the basis of the reference voltage and the first supply voltage, switching over from the first supply voltage to at least one second supply voltage different from the first supply voltage, and regulating the output voltage on the basis of the reference voltage and the second supply voltage.

The voltage regulator in accordance with embodiments described herein includes at least two output stages which may be operated at different supply voltages. A regulated output voltage at least one of the output stages may be provided on basis of a control signal which is generated by an error amplifier. The error amplifier provides the control signal on basis of at least a portion of fed-back output voltage and a reference voltage.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

Reference will now be made in detail to various embodiments, one or more examples of which are illustrated in the figures. Within the following description of the drawings, the same reference numbers refer to same components. Generally, only the differences with respect to individual embodiments are described. Each example is provided by way of explanation and is not meant as a limitation. For example, features illustrated or described as part of one embodiment can be used on or in conjunction with other embodiments to yield yet a further embodiment.

Figure 1:
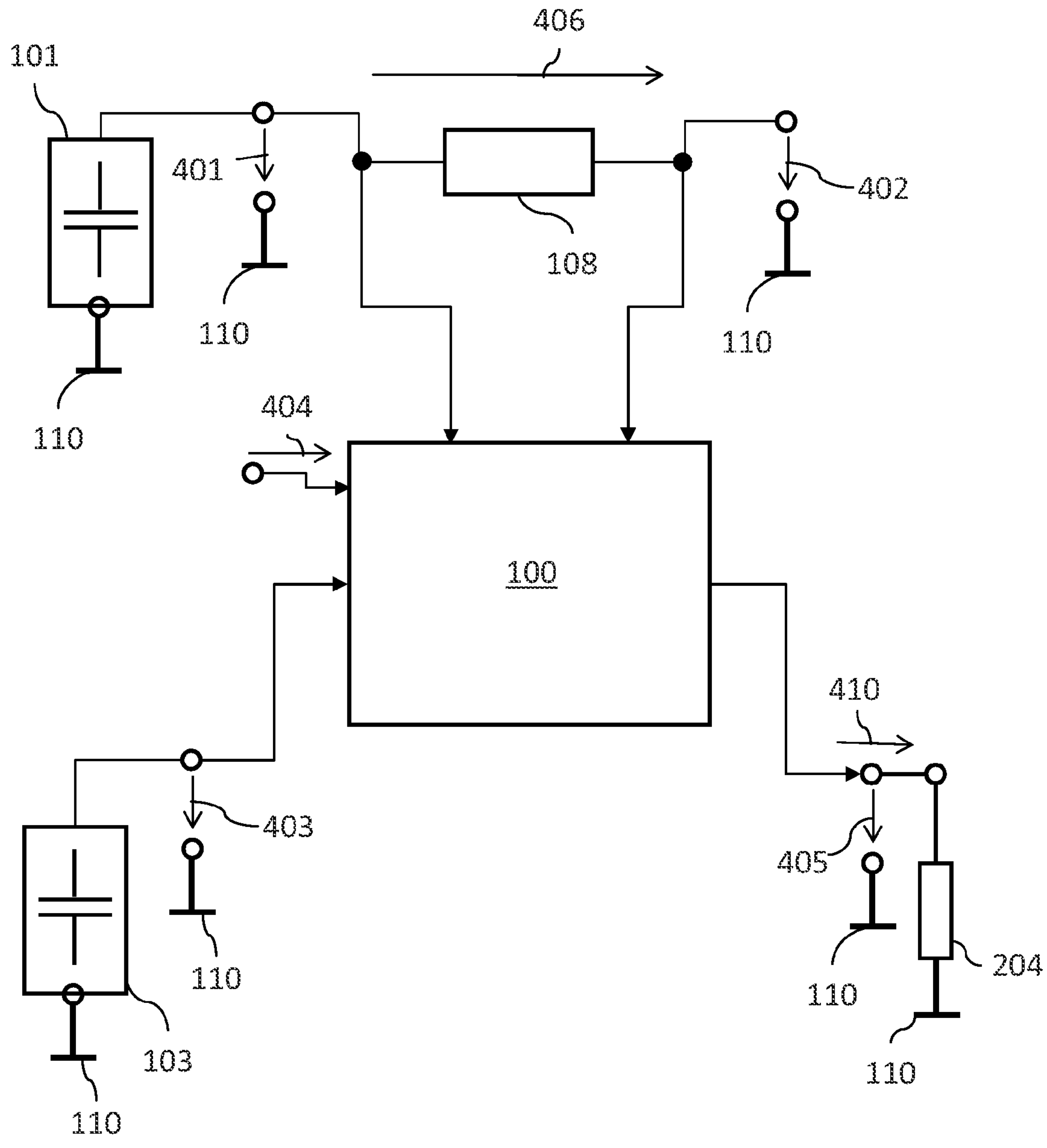
FIG. 1 shows a block diagram of a voltage regulator circuit provided with two different supply voltages according to an embodiment.

FIG. 1 shows a block diagram of a circuit arrangement including a voltage regulator circuit 100 in accordance with an embodiment. The voltage regulator circuit 100 is configured to provide an output voltage 405 which may be regulated to a desired constant value and an output current 410 which may change on the basis of power provided for an external load 204. Regulating the output voltage 405 is based on a reference voltage 403 provided as an input into the voltage regulator circuit 100. The reference voltage 403 is generated by a reference voltage source 103 which is connected between an input terminal of the voltage regulator circuit 100 and ground 110.

In accordance with an embodiment, a regulator supply voltage may be provided directly via a supply voltage source, e.g. a battery, or via at least one second supply voltage source, wherein the second supply voltage source may be operated by the first supply voltage source. A select signal 404 is input into the voltage regulator circuit 100, the select signal 404 determining a voltage domain which is used to operate the regulator circuit 100. A switch-over between different voltage domains and the operation via the select signal 404 received by the voltage regulator circuit 100 is described herein below with reference to FIGS. 4 and 5.

In the circuit arrangement shown in FIG. 1, a supply voltage for the voltage regulator circuit 100 may be provided in different ways. A first supply voltage source 101 is provided which generates a first supply voltage 401 (VDD1). The first supply voltage 401 may be applied directly at the voltage regulator circuit 100. In particular in mobile devices, a DC-DC converter 108 may be connected in series to the first supply voltage source 101, wherein a second supply voltage 402 (VDD2) is generated at an output terminal of the DC-DC converter 108. The second supply voltage 402 provided between the output terminal of the DC-DC converter 108 and ground 110 may also be provided for the voltage regulator circuit 100.

The select signal 404 may now be used to switch over between the first supply voltage 401 and the second supply voltage 402. The DC-DC converter 108 is used to reduce the first supply voltage 401 by an amount of a difference voltage 406 in order to provide the second supply voltage 402. The reduction of the first supply voltage 401 is advantageous, if the second supply voltage 402 is sufficient for operating the voltage regulator circuit 100. A reduced supply voltage for the voltage regulator circuit 100 results in a reduced power dissipation within the voltage regulator circuit 100, and thus in an increased operation time of battery-operated devices.

As an example, the first supply voltage source 101 may be provided as a lithium-ion-battery ($Li^+$ battery) which typically provides an output voltage of 4.2 V. In many battery-operated devices, a desired output voltage 405 of the voltage regulator circuit 100 is e.g.:

a. $U_{OUT}$=3 V.

The DC-DC converter 108, operated at an input voltage of 4.2 V may reduce the input voltage of 4.2 V to a value of 3.3 V.

Thus, by switching over to the second output voltage 402 the difference voltage 406 between the regulator supply voltage and the output voltage 405 may be reduced by a factor of four, e.g. the voltage difference for an operation with the second supply voltage 402 is a. (3.3 V−3 V)=300 mV, whereas the voltage difference during operation with the first supply voltage 402 is a. (4.2 V−3 V)=1200 mV.

This reduction in difference voltage 406 may lead to a large reduction of power dissipated within the voltage regulator circuit 100.

Then, a switch-over may be performed if the battery (e.g. the lithium-ion battery) is discharged to a level such that the output voltage of the DC-DC converter 108 drops below 3 V. In this case the voltage regulator circuit 100 is not able to provide a regulated output voltage 405 of 3 V. Then the first supply voltage source 101 is represented by the lithium-ion battery, such that the first supply voltage 401 is provided for the voltage regulator circuit 100. Now the difference between the first supply voltage 401 and the output voltage 405 of the voltage regulator circuit 100 has been reduced, because the battery is already discharged to a certain amount. Thus, an efficient use of battery power is provided.

Figure 2:
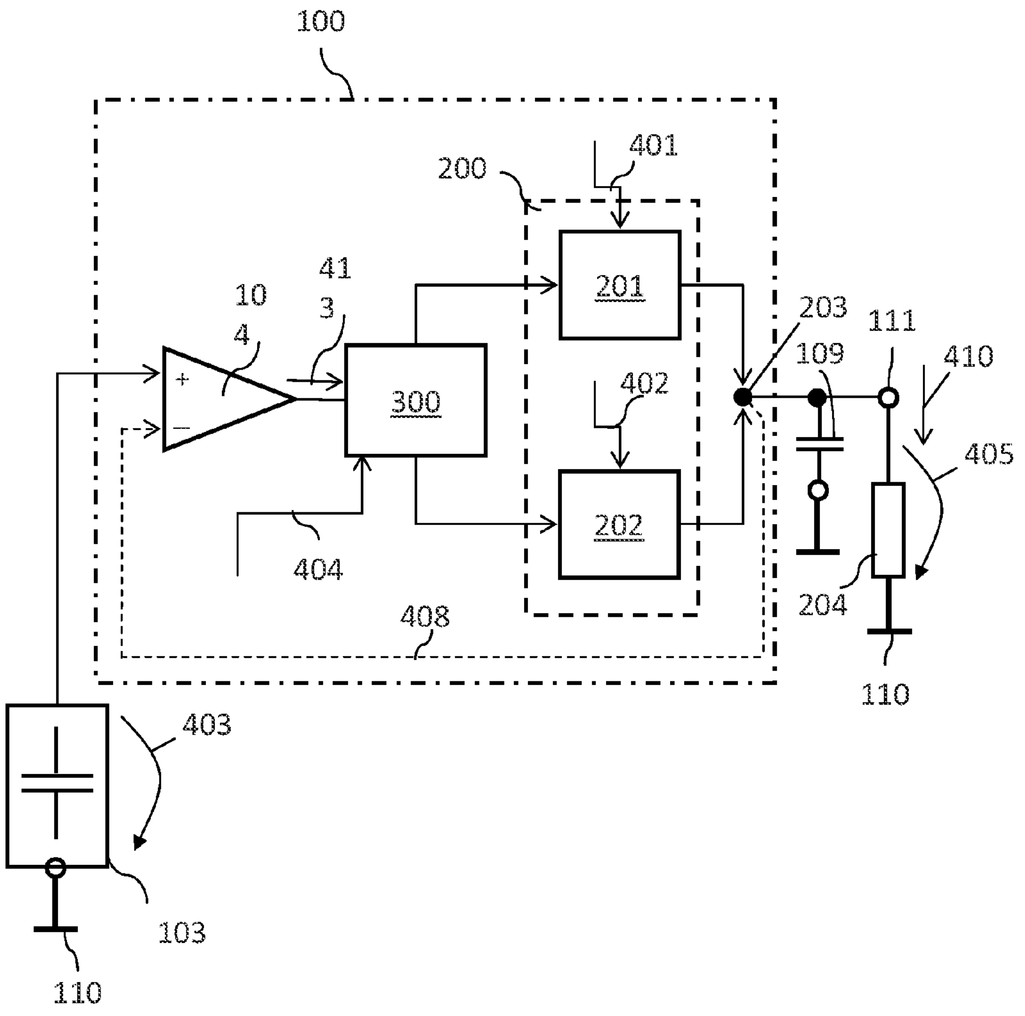
FIG. 2 is a detailed block diagram of a voltage regulator circuit having a switch-over unit according to an embodiment.

FIG. 2 is a block diagram for illustrating an operation of the voltage regulator circuit 100. The voltage regulator circuit 100 is connected to a reference voltage source 103 which provides a reference voltage 403 (see FIG. 1) as a basis for regulating the output voltage 405. The output voltage 405 is shown to be applied across the external load 204.

As shown in FIG. 2, the voltage regulator circuit 100 includes an error amplifier 104 which receives the reference voltage 403 from the reference voltage source 103 at its non-inverting input ("+" input). The inverting input ("−" input) of the error amplifier 104 receives a feedback signal 408 from a feedback node 203 at an output of the voltage regulator circuit 100. The feedback node 203 is connected to an output terminal 111 which provides a connection to the external load 204. An output current 410 of the voltage regulator circuit 100 flows from the output terminal 111 through the external node 204 toward ground 110.

Between the output terminal 111 and ground 110, a buffer capacitor 109 is connected. The buffer capacitor 109 provides smoothing of the output voltage 405 and reduced ripple distortion which might occur during switching over of different supply voltages 401, 402. On the basis of the feedback signal 408 and the reference voltage 403 provided at the inputs of the error amplifier 104, the error amplifier 104 generates a control signal 413 which is provided for regulating the output voltage 405 via a switch-over unit 300 and an output circuit 200.

The output circuit 200 includes two output stages, e.g. a first output stage 201 provided with the first supply voltage 401 (VDD1) and a second output stage 202 provided with the second supply voltage 402 (VDD2). On the basis of the select signal 404, the switch-over unit 300 directs the control signal 413 either to the first output stage 201 or the second output stage 202 of the output circuit 200 provided in the voltage regulator circuit 100. The present application is not restricted to an output circuit 200 having two output stages 201, 202, rather three or more output stages may be provided which may be operated at mutually different supply voltages. For example, more than two output stages 201, 202 may be provided if more than two different supply voltages 401, 402 are provided in order to operate the voltage regulator circuit 100.

The operation of the voltage control within the voltage regulator circuit 100 on the basis of the reference voltage 403 provided by the reference voltage source 103 and the feedback signal 408 is explained herein below with reference to FIG. 3. The output voltage 405 provided across the external load 204 is continuously controlled, even if there is a switch-over from the first output stage 201 operated at the first supply voltage 401 to the second output stage 202 operated at the second supply voltage 402. By switching over the output stages 201, 202, less chip area consumption is necessary as compared to the case, when the supply voltage for the entire voltage regulator circuit 100 is changed. Furthermore, distortion on the output voltage 405 is low.

The first output stage 201 may be operated at the first supply voltage 401 and may provide the output voltage 405 on the basis of the control signal 413. On the other hand, the at least one second output stage 202 provided in the output circuit 200 may be operated at the second supply voltage 402 different from the first supply voltage 401 and may provide the same output voltage 405 as the first output stage 401 on the basis of the control signal 413.

In the voltage regulator circuit 100 the switch-over unit 300 is provided, which is explained herein below in detail, and which may be regarded as a switch operated by the select signal 404. The switch-over unit 300 may direct the control signal 413 to one of the output stages 201, 202 provided in the output circuit 200 of the voltage regulator circuit 100.

The voltage regulator circuit 100 may be operated by supplying the first output stage 201 with the first supply voltage 401 and by providing the regulated output voltage 405 on the basis of the control signal 413, or by supplying the second output stage 202 with the second supply voltage 402 different from the first supply voltage 401 and by providing the regulated output voltage 405 on basis of the control signal 113.

Figure 3:
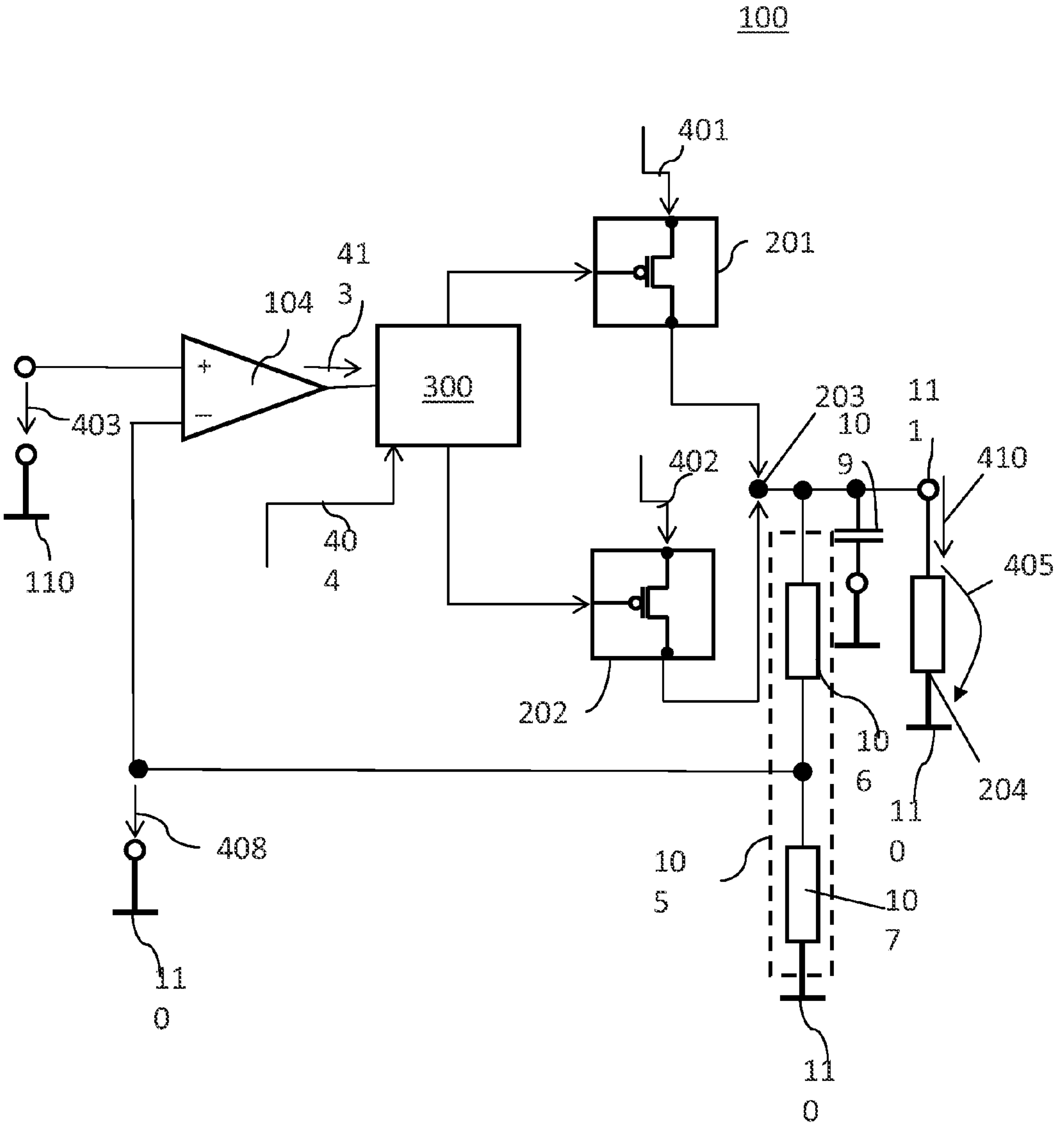
FIG. 3 is a detailed circuit diagram of the voltage regulator circuit depicted in FIG. 2.

FIG. 3 is a detailed block diagram of the circuit arrangement shown in FIG. 2, wherein the generation of the feedback signal 408 and the setup of the output circuit 200 are presented in more detail. The feedback signal 408 is provided as a voltage measured between the feedback node 203 and ground 110 such that the error amplifier 104 is capable of comparing the reference voltage 403 to the feedback signal 408. Thus, an output voltage 405 of the voltage regulator circuit 100 may be controlled.

Both the first output stage 201 and the second output stage 202 may include PMOS transistors. The respective gates of the PMOS transistors receive the control signal 413 via the switch-over unit 300. Either the first output stage 201 or the second output stage 202, depending on the select signal 404, is used to control a voltage potential at the feedback node 203, e.g. is used to control the output voltage 405 applied across the external load 204.

A part of the output current 410 flows through a voltage divider circuit 105 which is connected between the feedback node 203 and ground 110. In the circuit arrangement shown in FIG. 3, the voltage divider circuit 105 includes two resistors connected in series, e.g. a first voltage divider resistor 106 and a second voltage divider resistor 107. Thus, the output voltage 405 is divided in accordance with a divider ratio provided by the voltage divider circuit 105. A portion of the output voltage 405, e.g. the feedback signal 408, is provided at the inverting input ("−") of the error amplifier 104. The feedback signal 408 corresponds to a voltage which is applied across the second voltage divider resistor 107 of the voltage divider circuit 105.

When switching from the first output stage 201 operated at the first supply voltage 401 to the second output stage 202 operated at the second supply voltage 402, the output voltage 405 remains constant or nearly constant and a control loop is closed via output voltage feedback, the feedback voltage being provided by the voltage divider circuit 105.

Different supply voltages 401, 402 may be provided for the output stages 201, 202 of the output circuit (see FIG. 2), whereas the remaining circuit components, e.g. the error amplifier 104 and the switch-over unit 300 are operated at the higher supply voltage of the supply voltages 401, 402, which in this case corresponds to the supply voltage 401 (VDD1). Even if the supply voltages for the circuit components except for the second output stage 202 are operated at the higher supply voltage 401, a high efficiency of the entire voltage regulator circuit 100 may be obtained, because a voltage difference between the supply voltages 401, 402 and the output voltage 405 may be reduced, such that a reduced power dissipation within the output circuit 200 is obtained.

In accordance with the circuit arrangement shown in FIG. 3, two output stages 201, 202 may be operated alternatively with a single feedback loop. The single feedback loop is provided by the voltage divider circuit 105 and a line connecting the connection point of the series voltage divider resistors 106, 107 and the inverting input of the error amplifier 104. The voltage divider ratio of the voltage divider circuit 105 may be changed by changing at least one of the first voltage divider resistor 106 and the second voltage divider resistor 107. Due to the feedback loop, a change of the voltage divider ratio changes the output voltage 405.

Figure 4:
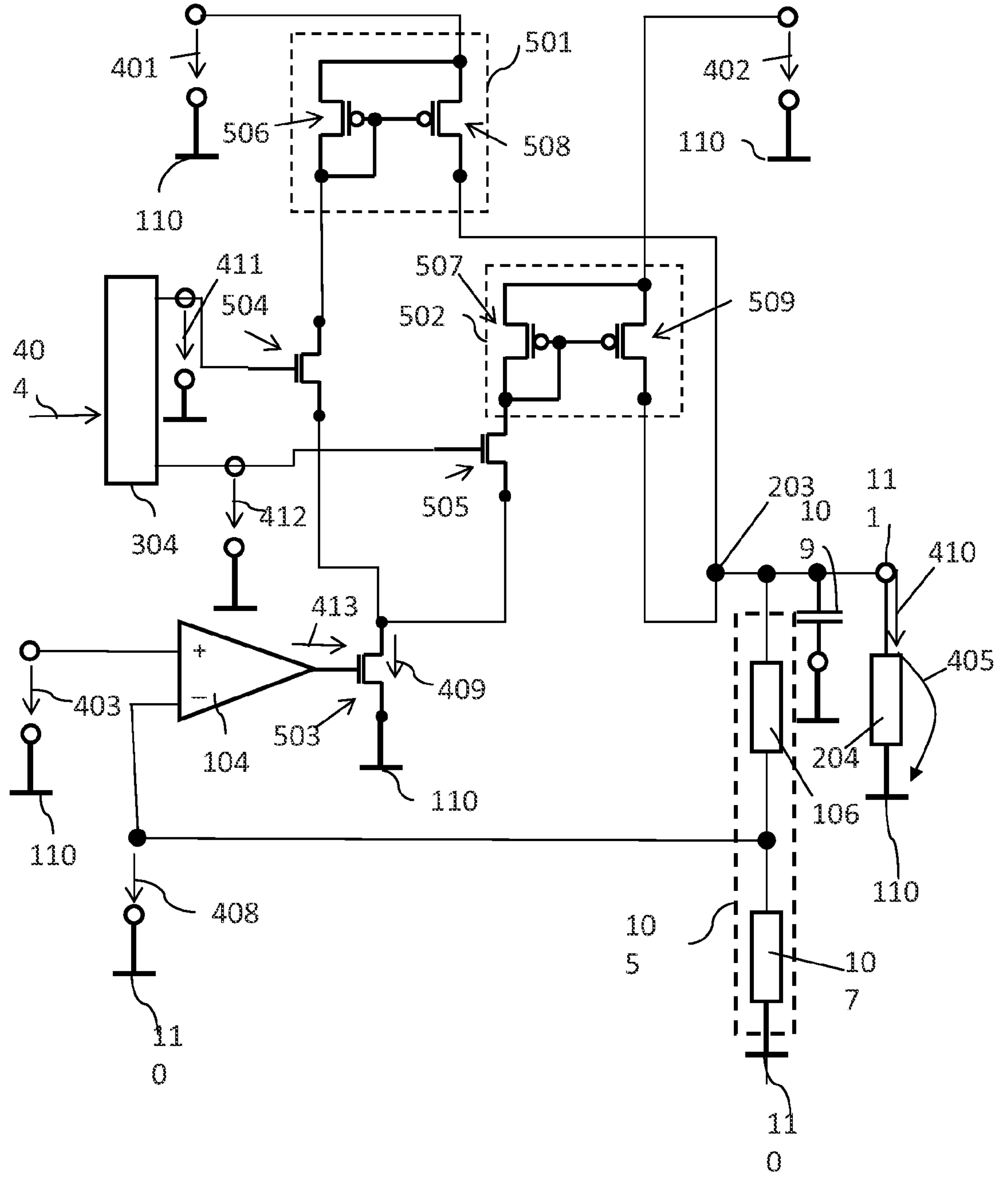
FIG. 4 is a detailed circuit diagram illustrating a voltage regulator circuit having current mirrors at its output stages according to an embodiment.

FIG. 4 is a detailed circuit diagram of a voltage regulator circuit according to yet another typical embodiment. As shown in FIG. 4, the output stages of the voltage regulator circuit include current mirror circuits, e.g. a first current mirror circuit 501 and a second current mirror circuit 502. The current mirror circuits are set up by PMOS transistors. One of the PMOS transistors within the current mirror circuits 501, 502 is connected for operation as a mirror diode, e.g. a first mirror diode 506 is provided in the first current mirror circuit 501, and a second mirror diode 507 is provided in the second current mirror circuit 502. A control of the output current 410 is provided by respective mirror transistors, e.g. by a first mirror transistor 508 of the first current mirror circuit 501 if the first supply voltage 401 is used for the operation of the voltage regulator circuit 100, and by a second mirror transistor 509 of the second current mirror circuit 502 if the second supply voltage 402 is used for the operation of the voltage regulator circuit 100.

The output signal of the error amplifier 104, e.g. the control signal 413, is received by a gate of a driver transistor 503. Furthermore, first and second cascode transistors 504, 505 receive an output signal of a switching unit 304. The switching unit 304 is controlled by the select signal 404 and outputs either a first switching voltage 411 or a second switching voltage 412 for controlling the respective cascode transistor 504 or 505. If the first cascode transistor 504 is selected by the select signal 404, the first cascode transistor 504 and the driver transistor 503 form a cascode circuit. On the other hand, if the second cascode transistor 505 is selected by the select signal 404, the second cascode transistor 505 and the driver transistor 503 form a different cascode circuit.

The feedback loop for controlling the output voltage 405 of the voltage regulator circuit 100 includes the voltage divider circuit 105 and a line connecting a connection point of the first voltage divider resistor 106 and the second voltage divider resistor 107 to the inverting input ("−") of the error amplifier 104. Thus, the obtained control signal 413 corresponding to a difference between the reference voltage 403 and the feedback signal 408 is used for controlling either the first current mirror circuit 501 or the second current mirror circuit 502.

The voltage regulator circuit 100 shown in FIG. 4 is set up in three stages, wherein the first stage is formed by the error amplifier 104, the second stage is formed by a combination of the first mirror diode 506 and the driver transistor 503, if the first output stage is selected, and by a combination of the second mirror diode 507 of the second current mirror circuit 502 and the driver transistor 503, if the second output stage is selected, and the third stage is represented by either the first mirror transistor 508, if the first output stage is selected, or by the second mirror transistor 509, if the second output stage is selected.

A driver current 409 flowing through the driver transistor 503 is approximately independent of the supply voltages 401 and 402, respectively, because the driver current 409 is mirrored into the output current 410 in dependence of current mirror ratios provided by either the first current mirror circuit 501 or the second current mirror circuit 502. In this way, the driver current 409 is transferred from the first current mirror circuit 501 to the second current mirror circuit 502, or vice versa, if switching-over by the select signal 404 is performed.

Figure 5:
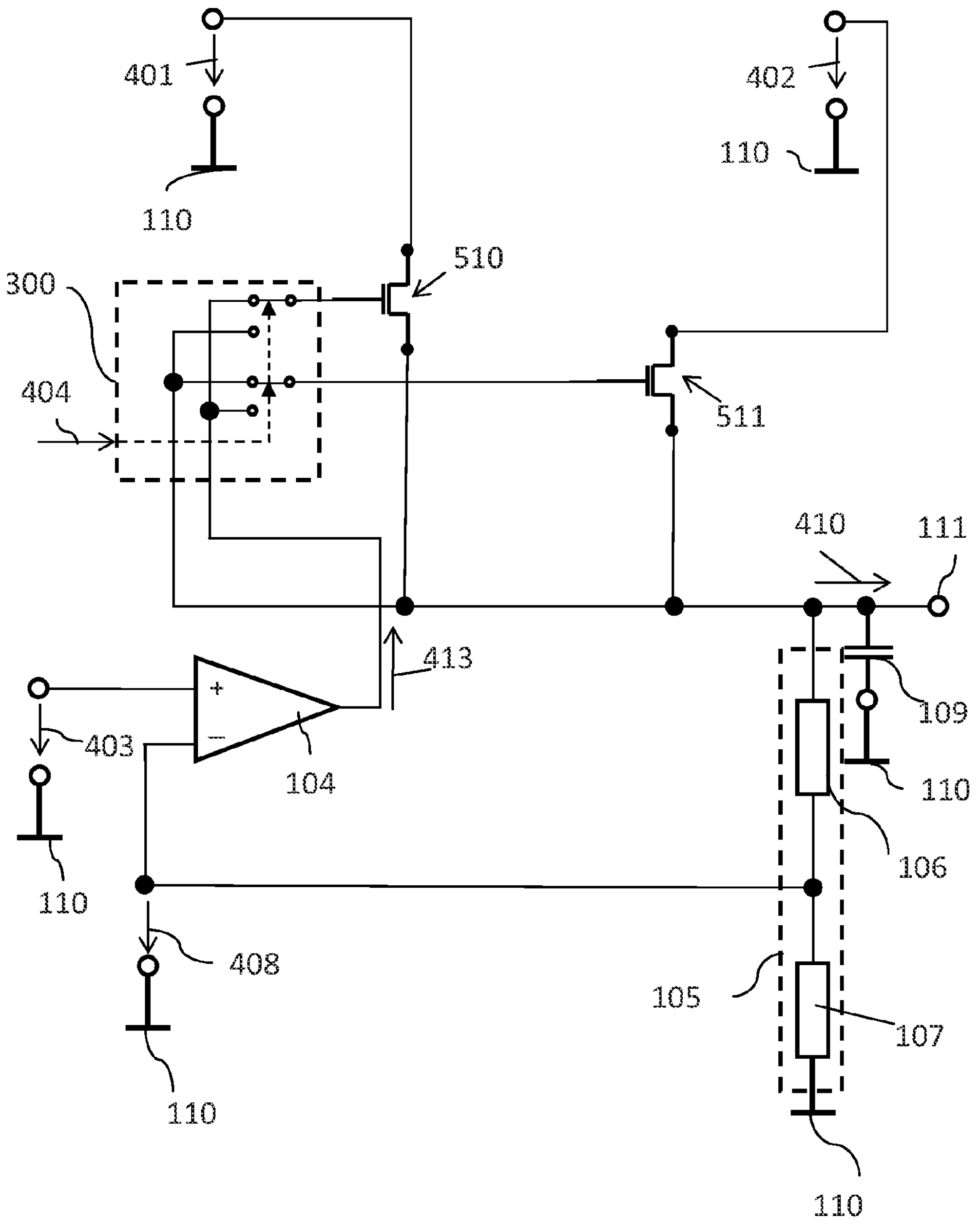
FIG. 5 is a circuit diagram illustrating a voltage regulator circuit provided with NMOS transistors according to an embodiment.

FIG. 5 is a detailed circuit diagram of a voltage regulator circuit in accordance with yet another embodiment. The circuit arrangement shown in FIG. 5 includes two stages which are set up by the error amplifier 104 (first stage) and output transistors 510 and 511 (second stage), respectively. As in the setup shown in FIG. 4, a switch-over unit 300 is provided in order to switch the control signal 413 output by the error amplifier 104 to either the first output stage, e.g. a first output transistor 510, or to the second output stage, e.g. the second output transistor 511.

As indicated in FIG. 5, the transistors 510, 511 of the output stages are provided as NMOS transistors, wherein the transistors used in the setup shown in FIG. 4 are provided as PMOS transistors. Components which have been described already with reference to FIGS. 1-4 are not described here in order to avoid a redundant description.

The switch-over unit 300 used in the voltage regulator circuits of the arrangement shown in FIGS. 1-3 is detailed in FIG. 5. As shown in FIG. 5, the switch-over unit 300 is set up by two switches which provide a connection of an output terminal of the error amplifier 104 to either the gate of the first output transistor 510 or the gate of the second output transistor 511. The output transistor 510, 511 which is not used for operation, is blocked by the second switch included in the switch-over unit 300. The switch-over unit 300 may be formed from at least two MOS switches, wherein each of the MOS switches may include a PMOS transistor connected in parallel to a NMOS transistor. The select signal 404 again is used for operating the switches included in the switch-over unit 300.

In FIG. 5 the load is not shown, but it is to be understood that the output terminal 111 is used for outputting the output current 410 to an external load. Thus, FIG. 5 is an implementation of the voltage regulator circuit of FIG. 2 in NMOS configuration, and FIG. 4 is an implementation of the voltage regulator circuit of FIG. 2 in PMOS implementation. Thereby, when switching over from the first supply voltage 401 to the second supply voltage 402 which is different from the first supply voltage 401, switching of the control signal 413 from the first output transistor 510 to the second output transistor 511 is performed.

Figure 6:
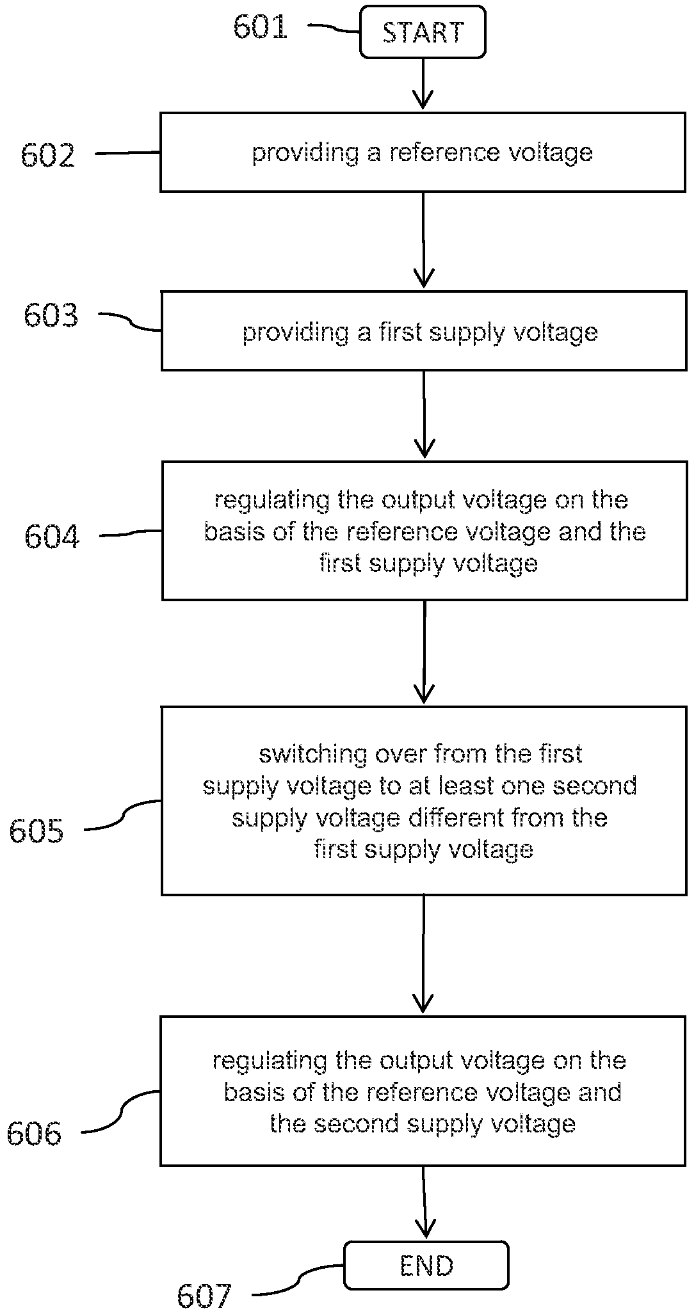
FIG. 6 is a flowchart illustrating a method for providing a regulated output voltage according to an embodiment.

FIG. 6 is a flowchart illustrating a method for providing a regulated output voltage 405 on the basis of a reference voltage 403, wherein two different supply voltages 401, 402 are used. The procedure is started (step 601). The reference voltage 403 is provided (step 602). The voltage regulator circuit described herein above is then provided with a first supply voltage 401 (step 603). A control of the output voltage 405 is then performed by regulating the output voltage 405 on the basis of the reference voltage 403 and the first supply voltage 401 (step 604).

If it is determined that another supply voltage for the voltage regulator circuit, in particular for the output circuit of the voltage regulator circuit is desired, then the voltage regulator circuit is switched over from the first supply voltage 401 to at least one second supply voltage 402 different from the first supply voltage 401 (step 605). Again, the voltage regulator circuit described herein above controls the output voltage 405 on the basis of the reference voltage 103 and the supply voltage, which in this case is the second supply voltage 402 (step 606). The procedure is then ended (607).

By providing the voltage regulation method described herein above, chip area consumption may be reduced. A smooth handover from one output stage to another output stage of the output circuit 200 may be obtained. Thereby, an efficient use of energy of a voltage source, e.g. in mobile electronic devices may be provided.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A voltage regulator circuit for providing a regulated output voltage, comprising:

an error amplifier configured to provide a control signal based on at least a portion of a fed-back output voltage and a reference voltage;

a first output stage configured to operate at a first supply voltage and provide the regulated output voltage based on the control signal;

at least one second output stage configured to operate at a second supply voltage different from the first supply voltage and provide the regulated output voltage based on the control signal;

a switch-over unit configured to switch over the control signal between the first output stage and the second output stage; and a DC-DC converter configured to provide the second supply voltage based on the first supply voltage, wherein the second supply voltage is lower than the first supply voltage.

2. The voltage regulator circuit in accordance with claim 1, further comprising a reference voltage source configured to provide the reference voltage.

3. The voltage regulator circuit in accordance with claim 1, further comprising a first supply voltage source configured to provide the first supply voltage.

4. The voltage regulator circuit in accordance with claim 1, wherein the first output stage and the at least one second output stage each comprise current minor circuits.

5. The voltage regulator circuit in accordance with claim 4, wherein each current mirror circuit is formed by PMOS transistors.

6. The voltage regulator circuit in accordance with claim 1, wherein the switch-over unit comprises at least two MOS switches.

7. The voltage regulator circuit in accordance with claim 6, wherein each MOS switch comprises a PMOS transistor connected in parallel to a NMOS transistor.

8. An electronic circuit for providing an output voltage, comprising:

an output circuit configured to be controlled by a control signal, the output circuit comprising:

a first output stage configured to operate at a first supply voltage and provide the output voltage based on the control signal; and at least one second output stage configured to operate at a second supply voltage different from the first supply voltage and provide the output voltage based on the control signal;

a switch-over unit configured to switch over the control signal between the first output stage and the second output stage; and a DC-DC converter configured to provide the second supply voltage based on the first supply voltage, wherein the second supply voltage is lower than the first supply voltage.

9. The electronic circuit in accordance with claim 8, further comprising a first supply voltage source configured to provide the first supply voltage.

10. The electronic circuit in accordance with claim 8, wherein the first output stage and the at least one second output stage each comprise current minor circuits.

11. The electronic circuit in accordance with claim 10, wherein each current minor circuit is formed by PMOS transistors.

12. The electronic circuit in accordance with claim 8, wherein the switch-over unit comprises at least two MOS switches.

13. The electronic circuit in accordance with claim 12, wherein each MOS switch comprises a PMOS transistor connected in parallel to a NMOS transistor.

14. A method for providing a regulated output voltage, comprising:

providing a reference voltage;

providing a first supply voltage;

regulating the output voltage based on the reference voltage and the first supply voltage;

switching over from the first supply voltage to at least one second supply voltage different from the first supply voltage;

providing the second supply voltage by a DC-DC converter based on the first supply voltage, the second supply voltage being lower than the first supply voltage; and regulating the output voltage based on the reference voltage and the second supply voltage.

15. The method in accordance with claim 14, wherein a control signal is provided based on at least a portion of a fed-back output voltage and the reference voltage, the control signal controlling at least one of a first output stage and a second output stage.

16. The method in accordance with claim 15, further comprising operating the first output stage at the first supply voltage and providing the regulated output voltage based on the control signal.

17. The method in accordance with claim 15, further comprising:

operating the second output stage at the at least one second supply voltage different from the first supply voltage; and providing the regulated output voltage based on the control signal.

18. The method in accordance with claim 14, wherein switching over from the first supply voltage to at least one second supply voltage different from the first supply voltage comprises switching over the control signal from the first output stage to the second output stage.

* * * * *